JAMES & ANDREW FOX.
Improvement in Fertilizers.
No. 124,487.                          Patented March 12, 1872.
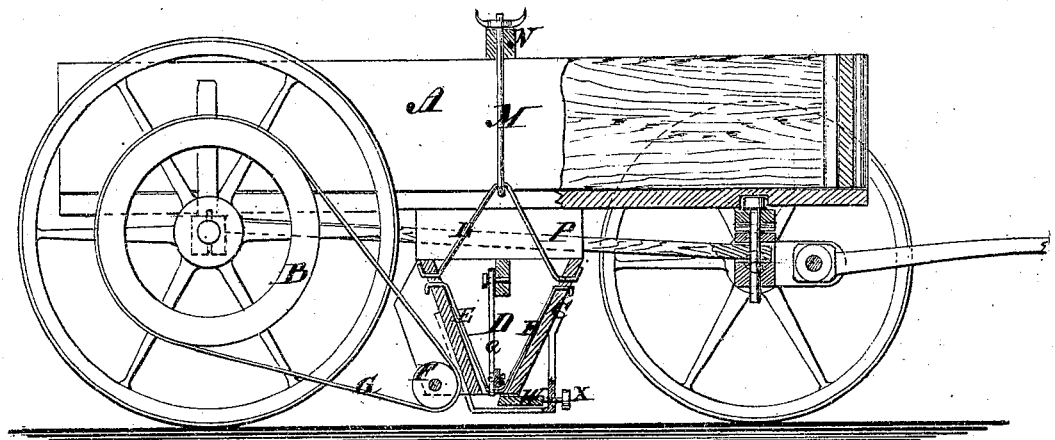
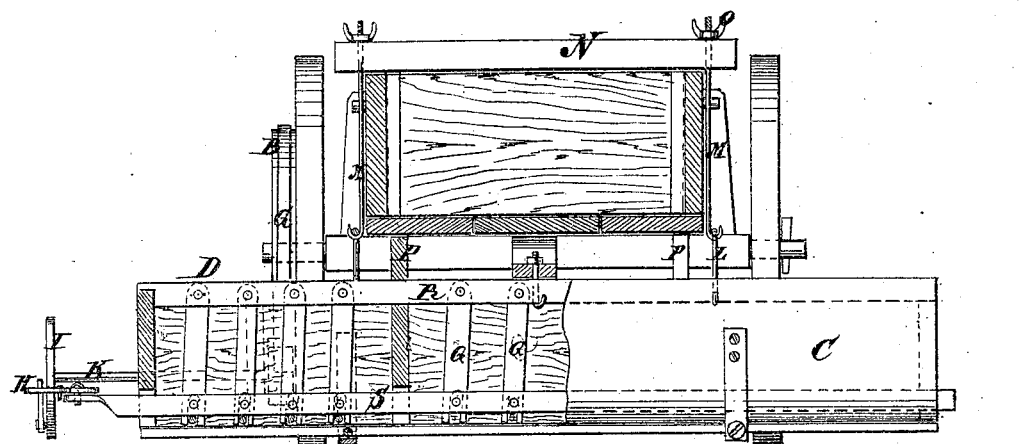

No. 124,487

UNITED STATES PATENT OFFICE.

JAMES FOX AND ANDREW FOX, OF AVOCA, NEW YORK.

IMPROVEMENT IN FERTILIZERS.

Specification forming part of Letters Patent No. 124,487, dated March 12, 1872.

*To all whom it may concern:*

Be it known that we, JAMES FOX and ANDREW FOX, of Avoca, in the county of Steuben and State of New York, have invented a new and Improved Plaster-Sower; and we do hereby declare that the following is a full, clear, and exact description thereof, which will enable others skilled in the art to make and use the same, reference being had to the accompanying drawing forming part of this specification.

The invention will first be fully described, and then clearly pointed out in the claim.

Figure 1 is partly a side elevation and partly a section of a wagon and the apparatus rigged thereon, and Fig. 2 is a transverse section.

A represents the box of an ordinary farm-wagon, one of the wheels of which is provided with a belt-rim, B. C is the long hopper or trough, such as commonly employed on machinery for sowing plaster. D E represent the agitator; F, the pulley for driving it by a crank, H, said pulley being worked by a belt, G, driven by rim B, and the crank being connected with said pulley by means of the disk I and a shaft, K. I propose to attach the trough to the box of the wagon by suspending it at the under side between the wheels transversely by means of the bails L, hooked rods M, and a cross-bar, N, resting on the top, and extending across it and beyond the sides at each end. The said hooked rods pass up through holes in the bar, and are held by nuts o at the top. The said trough is provided with pieces P on the top, to be held up snugly against the bottom, for steadying it; or the said pieces may rise up between or outside of the side boards, close to them, as preferred. In addition to the central vertical rods Q of the agitator, which are pivoted to the bar R and worked by the reciprocating bar S, we propose to employ the bent V-shaped rods E for working near the surface of the sides of the hopper to prevent the plaster clogging them; the said ends being connected to the said sides at the upper ends, and to the bar S at the apex of the V points, as shown, to be operated by the said bar S. The trough is provided with a slide, W, at the bottom for regulating the feed, said slide being provided with screws X for working it.

Having thus described our invention, we claim as new and desire to secure by Letters Patent—

The trough, arranged and adapted for sowing plaster, and provided with an agitator, a driving-shaft and gear connecting it with the agitator, to be worked by a belt from one of the wheels of a wagon, suspended from the box of a wagon, substantially in the manner specified.

JAMES FOX.
ANDREW FOX.

Witnesses:
JAMES TULL,
JOHN H. PUTMAN.